(No Model.) 6 Sheets—Sheet 3.

D. STUCK.
DENTAL CHAIR.

No. 457,059. Patented Aug. 4, 1891.

Fig. 5.

Witnesses:
R. F. Osgood
C. G. Crannell

Inventor:
Dewell Stuck,
By Geo. B. Selden,
Atty

UNITED STATES PATENT OFFICE.

DEWELL STUCK, OF ROCHESTER, NEW YORK.

DENTAL CHAIR.

SPECIFICATION forming part of Letters Patent No. 457,059, dated August 4, 1891.

Application filed September 19, 1889. Serial No. 324,428. (No model.)

*To all whom it may concern:*

Be it known that I, DEWELL STUCK, a citizen of the United States, residing at Rochester, in the county of Monroe, in the State of New York, have invented certain Improvements in Dental Chairs, of which the following is a specification, reference being had to the accompanying drawings.

My invention relates to certain improvements in the construction of dental chairs, having reference more particularly to the mechanism by which the chair-seat is raised, lowered, or sustained in any given position, to the devices by which the chair-back and the head-rest are made adjustable, and to an improved adjustable foot-rest.

The objects of the invention are to extend the range of adjustability of the chair-back and head-rest without increasing unduly the complexity of the parts; to provide a chair-back that can be adjusted to and below the lowest level of the seat; to provide an adjustable back that can be easily pushed with one hand against the sitter and be locked in the desired position by the same operation; to provide an efficient hydraulic lowering piston that will avoid the disagreeable noise incident to the passage of a liquid through a small aperture or apertures of the form heretofore used; to provide an efficient clutching, lifting, and lowering mechanism; to provide a foot-rest that can be raised vertically and tilted toward the chair by a single treadle-lever mechanism and automatically locked in any desired position and unlocked by a similar lever, and to secure other incidental advantages; and the invention consists in the parts and combinations hereinafter described and particularly pointed out.

In the accompanying drawings, representing my improvements in dental chairs.

In the accompanying drawings, A represents the base or pedestal.

B is the plunger, which supports the seat C.

D is the back, which is adjustably supported on the standard E by the slide F.

G is the head-rest, and H the foot-rest.

The seat and parts attached thereto are supported on the plunger B, which is arranged to be raised by sliding in the pedestal by means of the foot-lever I, so as to adjust the chair to any desired vertical position.

J is a lever by which the plunger is lowered.

Figure 5:
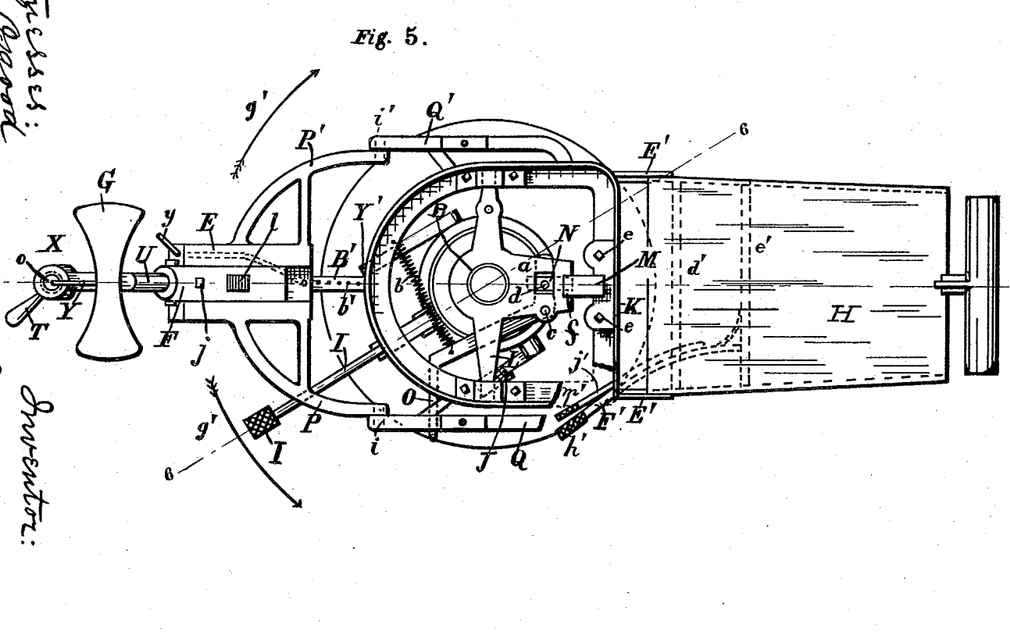
Fig. 5 is a plan view, the back, arm-rest, and upholstered seat being omitted.

The seat is supported on a suitable seat-frame K, which is pivoted on the ends of an arm L, Fig. 5, attached to the upper end of the plunger, so that the seat and its connected parts can be inclined backward to any desired degree. Provision is made for securing the seat in any position to which it may be adjusted by the curved toothed rack M, Figs. 2 and 5, attached to the inner front portion of the seat-frame, and with which rack the sliding bolt N engages. This bolt is arranged to slide in a forwardly-projecting extension $a$ of the arm L, being arranged to be operated by the lever O, provided with the spring $b$, Fig. 5. The lever O is pivoted at $c$, Fig. 5, to the extension $a$, and extends outward and downward, terminating in a suitable foot-piece, by which the lever and bolt is operated by the pressure of the foot when it is desired to vary the inclination of the chair. The inner end of the lever is pivoted to the bolt N at $d$, Fig. 2, by a pin or screw which passes through a slot in the lever. The spring $b$ is attached at one end to the lever and at the other end to the seat-frame, so that it operates to keep the front end of the bolt engaged with some one of the teeth of the rack M, except when the bolt is withdrawn from such engagement by the pressure of the operator's foot on the lever O. The rack M is attached to the inwardly-projecting flange of the seat-frame by the screws $e$ $e$, Fig. 5, passing into lugs on the rack. At its upper end the rack is provided with a projection $f$, Fig. 2, which by coming in contact with the end of the extension $a$ prevents the chair from being inclined too far forward, and at its lower end it is provided with a stop $g$, Fig. 2, which may be a rubber bumper, which limits the backward inclination of the seat. The ends of the arm L are pivoted in suitable eyes or sockets secured to the seat-frame.

The back-standard E is attached to the seat-frame by means of the arms P P', which are pivoted at $i$ $i'$ to the arms Q Q', which also support the detachable arm-rests R. The arm-rests are provided with pins which enter openings in the arms Q Q', (see Fig. 5,) so that they can be detached, when desired. The standard is provided with a suitable groove, in which the slide F can be adjusted up and down, being arranged to be secured in any desired position by the clamp-screw and hand-wheel S. The slide carries the head-rest G and the back D, which is pivoted to the slide at $j$ and attached thereto, so that its lower end may be varied in its inclination therewith by means of the pivoted adjusting-bar $k$, which engages a series of teeth $l$ on the slide. The bar is pivoted to the back at $m$, Fig. 1, and provided with laterally-projecting arms $n$, by which its inner end is swung up and down, so as to engage it with any one of the teeth $l$ for the purpose of varying the inclination of the back relatively to the slide, as indicated by the full and dotted lines in Fig. 2. It will be observed that the teeth $l$ are arranged in a curved or inclined line relatively to the slide to secure the requisite adjustments of the back. As said back is pivoted at its upper end, a slight push or pull on the bar will effect the desired adjustment to exactly fit a sitter's back, the bar being easily guided in the operation to a suitable notch and the whole effected by one hand. This construction is both simple and efficient. The standard E is also adjustable.

I am aware that a back has been pivoted at its top to a fixed standard, and such device is not of my invention.

The head-rest G is adjusted to and secured in any desired position by means of a single clamp-screw T in the following manner: The cylindrical stem U is fitted to slide lengthwise and turn axially in the slide F, and is provided with an angularly-arranged arm V, which carries the clamp X, from which the head-rest is sustained by the rod Y. The rod Y is provided on the end where it engages with the clamp X with a ball $o$, which permits the adjustment of the head-rest into any position relatively to the clamp, which is itself movable lengthwise, carrying the head-rest with it on the arm V. The stem U is movable lengthwise in the slide, as indicated by the full and dotted lines in Fig. 2, and it will thus be observed that provision is made for placing the head-rest in any desired position relatively to the back, while the arrangement is such that it can be secured in any such position by a single movement of the clamp-screw T, which clamps all the joints at the same time, clamping the ball $o$ in the clamp X, the clamp X on the rod V, and the stem U in the slide F. This result is effected in the following manner: The clamp X consists of a suitable transversely-slotted socket-piece $p$, fitted to slide freely on the arm V, provided at its upper end with a screw-cap $q$, which fits over the ball $o$ and clamps it in place when the screw T is set up against bar $v$, which passes through the slot in socket piece or holder $p$, a suitable recessed friction-piece or movable socket $r$ being interposed between the ball and the arm V. The ball is thus prevented from turning in the clamp and the clamp is secured on the arm V.

Figures 2, 3, 4:
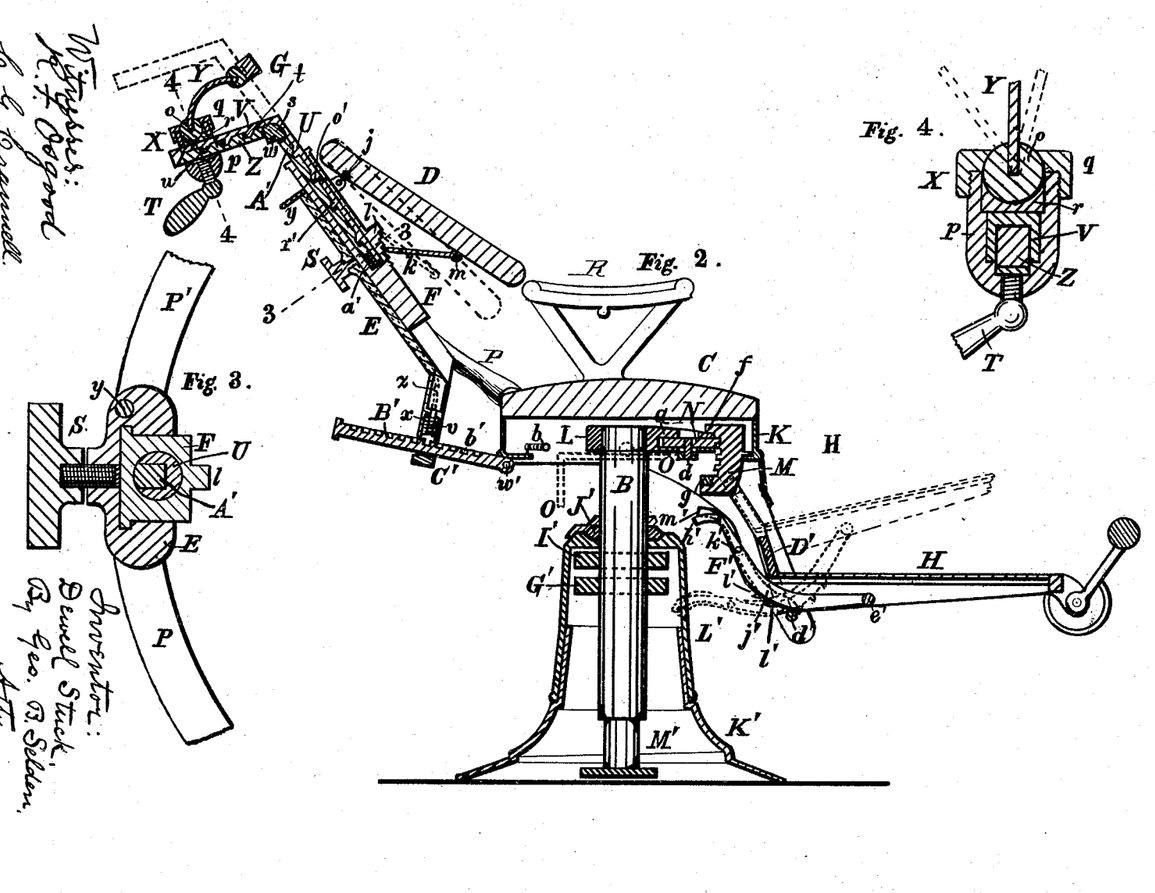
Fig. 2 is a central longitudinal section, on the line 2 2, Fig. 5, of the mechanism for operating the plunger, the elevating and sustaining clutch devices shown in Figs. 6 and 9 being omitted.
Fig. 3 is a section through the back-standard and slide on the line 3 3, Fig. 2.
Fig. 4 is a section through the head-rest clamp on the line 4 4, Fig. 2.

In order to cause the pressure of the clamp-screw T to bind the stem U in the slide E, I fit into a longitudinal slot in the arm V a bar Z, which is caused to move lengthwise by the force exerted by the screw, and this motion is transmitted by a pivoted angle-piece $s$, Fig. 2, which moves the bar A', located in a slot in the stem lengthwise and outward, thus clamping the stem in the opening in the slide. The bar Z is provided on its inner edge with a series of inclined recesses $t$, Fig. 2, which fit against a corresponding series of inclined teeth $u$, projecting from the bottom of the slot in the arm V, the arrangement being such that when the bar Z is forced inward by the clamp-screw the inclined surfaces cause it also to shift lengthwise, the bar moving toward the stem U. At the corner between the arm V and the stem U is pivoted the swinging angle-piece $s$, which is caused to turn on its pivot $w$ by the movement of the bar Z, thus shifting the bar A' in the slot in the stem U lengthwise. The bottom of the slot in the stem U is provided with a series of inclined teeth or projections $o'$, which fit into corresponding recesses $r'$ in the bar A', so that when the latter is moved lengthwise it is also forced outward, binding the stem U in the hole in the slide F, in which it is fitted. A spring $a'$, Fig. 2, serves to return the bars A′ Z to their normal positions when the pressure of the clamp-screw T is released.

Figure 1:
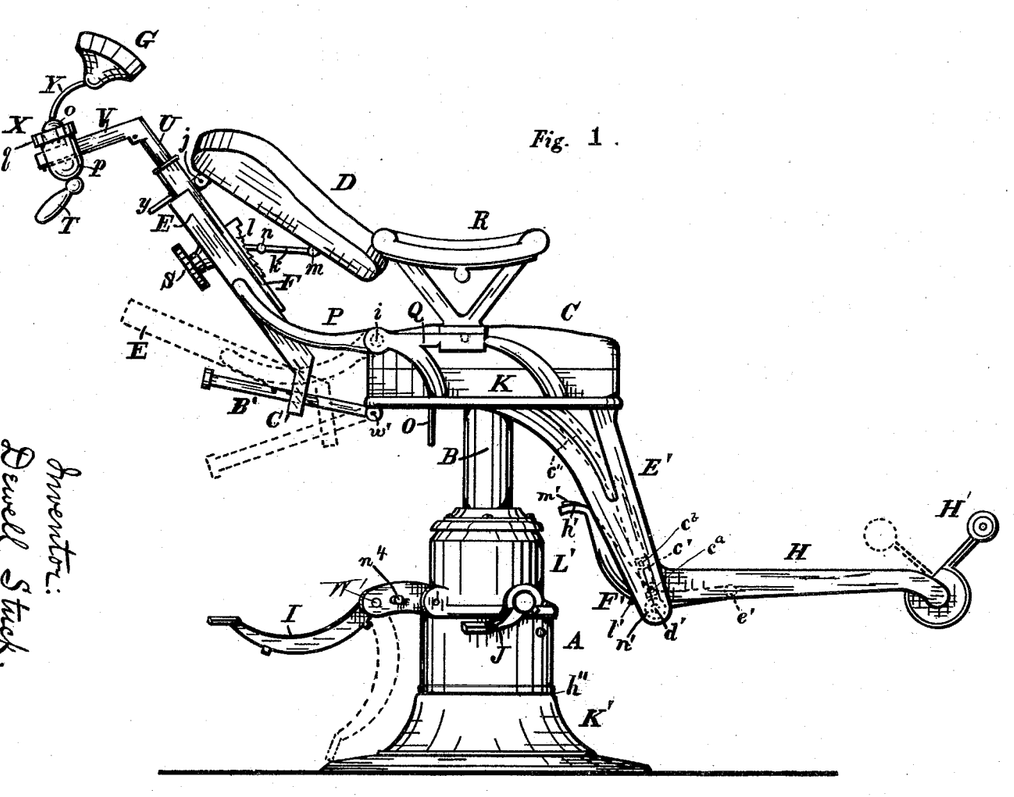
Figure 1 is a side elevation.

The standard E is arranged so as to be set at various angles with the seat by means of the pivoted bar B′, which is provided with a series of openings or notches $b'$, with which the catch $v$ engages, so that the inclination of the standard can be varied, as represented in the full and dotted lines in Fig. 1. The bar B′ is pivoted to the seat-frame at $w'$ out of line with the pivots $i\ i'$ and extends rearward through a slotted opening in the extension C′ on the lower end of the standard. The catch $v$ is caused to engage with any one of the openings $b'$ in the bar B′ by the spring $x$, located in a suitable recess in the extension C′. The catch is provided with a suitable handle by which it is manipulated—such, for instance, as the hand-piece $y$, located at or near the top of the standard and provided with a stem which slides in a hole in the standard and connected with the catch by a cord $z$, Fig. 2.

The location of the hand-piece near the top of the chair obviates the necessity of the operator's stooping. The cord, spring, and catch, which are somewhat unsightly, are concealed from view within the standard, where they are also protected from accidental interference. The bar B′ is made of sufficient length to enable the operator to adjust the standard, which swings on the pivots $i\ i'$, so as to bring the back into any desired position from vertical, or nearly so, to the horizontal or even lower, as is required when the chair is adapted to some purposes other than use by dentists.

The adjustment of the foot-rest H relatively to the seat is secured by causing its inner portion D′, Fig. 2, to slide in suitable grooves or guideways in the side pieces E′, projecting downward on each side from the seat-frame, and by providing the curved lever F′, by which it is elevated. The side pieces E′ E′, Figs. 1 and 5, are attached to the seat-frame in any convenient way and project forward and downward a suitable distance. They are provided on their inner faces with grooves, (represented by the dotted lines $c'\ c''$, Fig. 1,) in which lugs or pins $c^a\ c^b$, inserted in the edges of the inner portion D′, Fig. 2, of the foot-rest slide. The pins may be provided with friction-rollers or friction-slides pivoted thereon. It will be observed that the upper portion of the grooves $c''$ are inclined backward at a somewhat greater angle than the lower portions, so that as the foot-rest H rises its outer extremity has a somewhat greater travel than the inner end. A cross-bar $d'$ extends between the lower ends of the side pieces E′ E′ below the foot-rest. The lever F′ is pivoted to the foot-rest at $e'$ and rests upon the cross-bar $d'$, on which it also slides when pressure is applied to its upper end $h'$ to raise the foot-rest.

The operation of the lever in raising the foot-rest is represented by the full and dotted lines in Fig. 2. When the operator presses on the end $h'$ of the lever F′, the other end of the lever rises, elevating the foot-rest, while the lever itself slides along the cross-bar $d'$, the pivoted catch $j'$ engaging with one of its teeth on the bar $d'$, so as to hold the foot-rest to the elevated position to which it may have been raised. The catch $j'$ is pivoted to the side of the lever F′ at $k'$, Fig. 2, and extends downward along the side of the lever, being given a corresponding curve and provided with a series of teeth or hooks $l'\ l'$, which engage by the greater weight of the lower end of the catch with the cross-bar $d'$. At its upper end the catch terminates in a foot-piece $m'$, arranged on the inside of and slightly above the end $h'$ of the lever F′, so that when it is desired to lower the foot-rest the tooth $l'$, which has been engaged with the cross-bar, is disengaged therefrom by the pressure of the foot on the upper end of the pivoted catch, the descent of the foot-rest being controlled by the foot-lever F′. Rubber cushions may be provided to prevent jar, such cushions being conveniently applied as collars $n'$, Fig. 1, placed on the cross-bar $d'$ inside the side pieces.

The foot-rest may be provided with the additional swinging foot-support H′, Fig. 1.

Proceeding now to a description of the mechanism by which the seat is elevated, lowered, and secured in any desired position, it consists, essentially, of the lifting-clutch G′, the holding-clutch I′, the clamp J′, all of which operate on the cylindrical plunger B, and of the fluid-column lowering mechanism M′, located within the plunger.

The base or standard A consists of two parts, the lower one K′ of which is provided with suitable projecting feet or a flange forming a pedestal which supports the whole structure, and to which the upper cylindrical part L′ is fitted so that it can turn in the horizontal plane, so that the body of the chair can be swung horizontally, as indicated by the arrows $g'$ in Fig. 5. The pedestal K′ is provided with a sleeve $f'$, projecting upward inside the lower part of the cylinder L′, which is fitted to turn thereon, the lower part of the cylinder resting on a projecting rim or flange on the pedestal at $h''$, Fig. 6. The lifting-lever I, the lowering-lever J, and the clamp-lever Y′ are all attached to the cylindrical part L′ of the base and swing with it.

Figures 6, 7, 8:
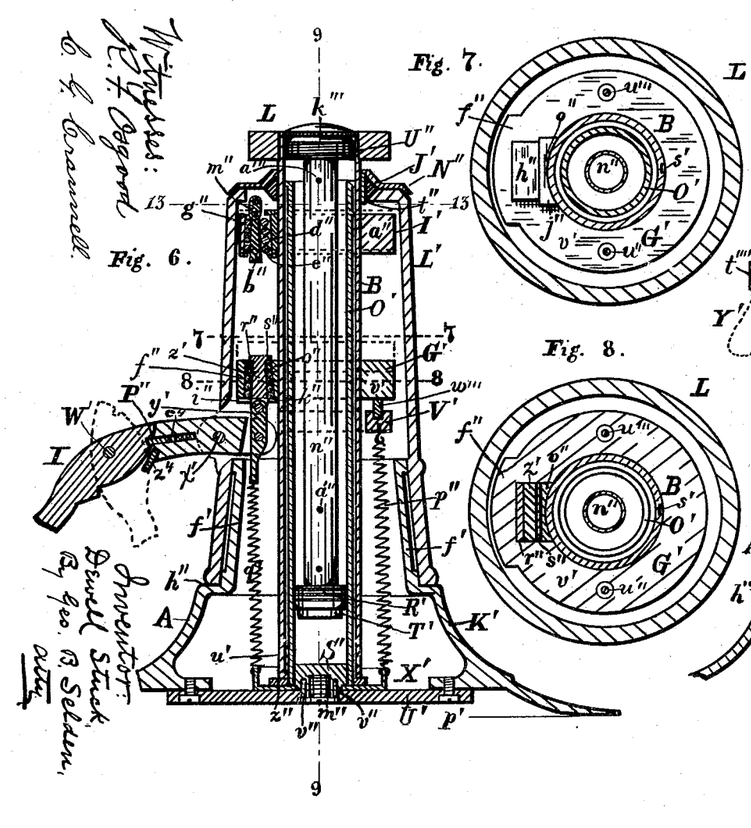
Fig. 6 is a central vertical section through the base in the plane of the lifting-lever on the line 6 6, Fig. 5.
Fig. 7 is a horizontal section on the line 7 7, Fig. 6, showing the lifting-clutch in plan view.
Fig. 8 is a horizontal section on the line 8 8, Fig. 6.
Figures 11, 12, 13, 14, 15, 16, 17, 18, 19, 20:
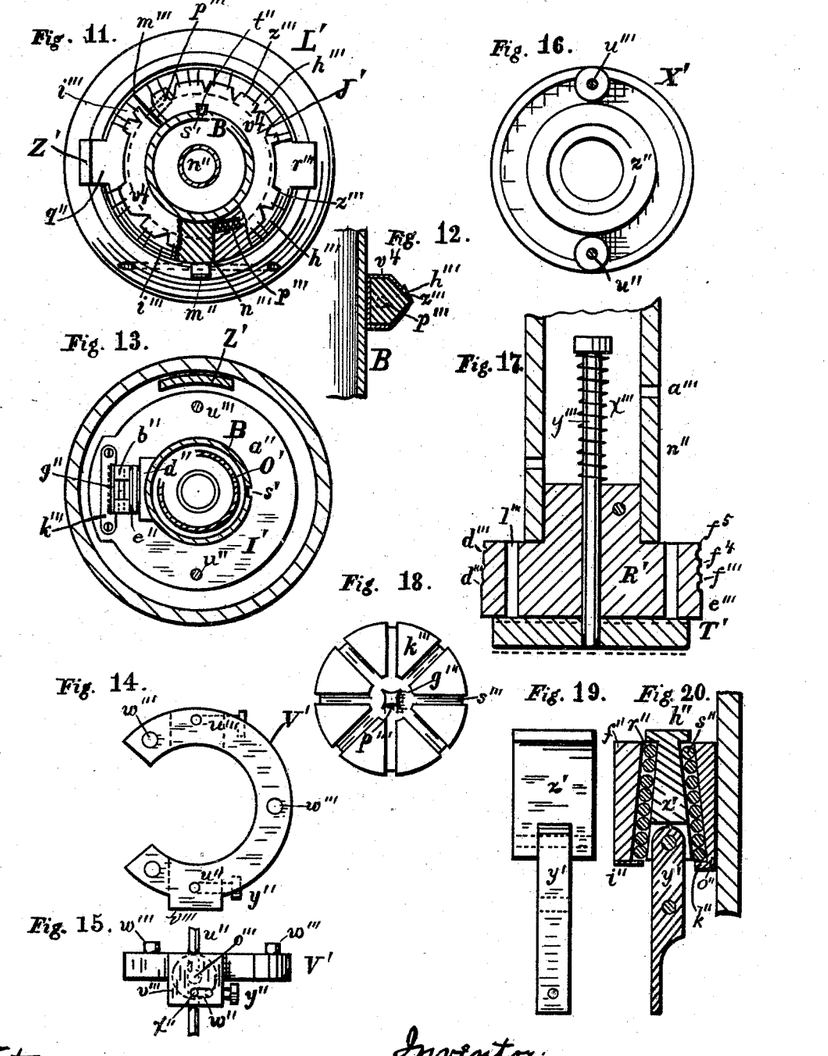
Fig. 11 represents the upper end of the standard, showing the clamp.
Fig. 12 is a vertical section of one portion of the clamping-ring.
Fig. 13 is a horizontal section on the line 13 13, Fig. 6, showing the holding-clutch in plan view.
Figs. 14 and 15 are respectively plan and side views of the segmental collar.
Fig. 16 is a plan view of the flange-plate.
Fig. 17 is a vertical section through the piston of the lowering mechanism.
Fig. 18 represents the lower side of the cap at the top of the plunger.
Fig. 19 is a side view of the wedge of the lifting-clutch and its connecting-link.
Fig. 20 is a vertical radial section through one side of the lifting-clutch, showing the link, wedge, rollers, and a portion of the plunger.
Figures 21, 22:
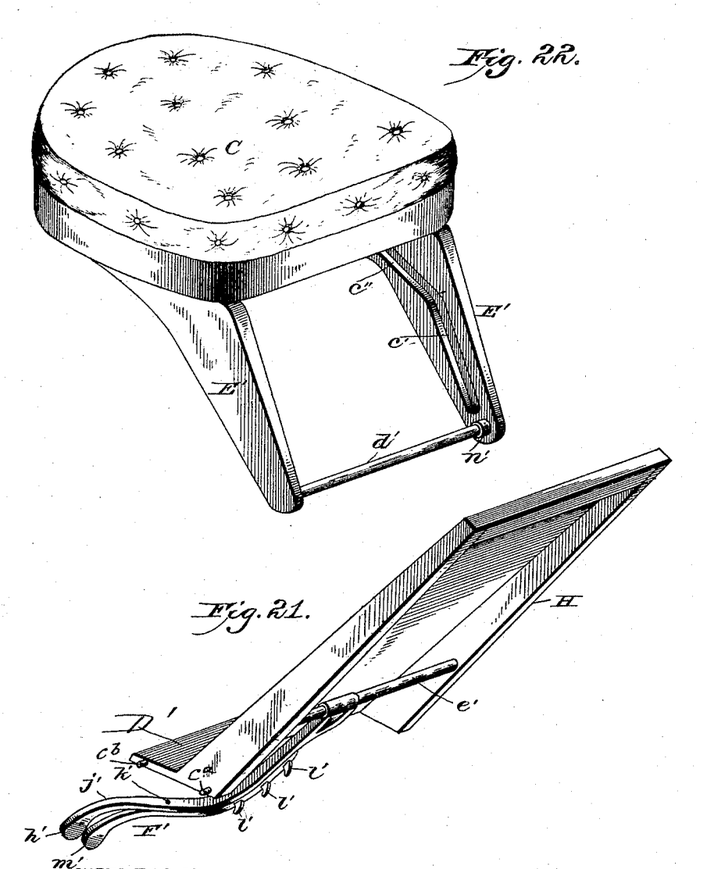
Figs. 21 and 22 are perspective views, respectively, of the foot-rest and connected mechanism and of the chair-seat frame and depending arms.

The construction and operation of the lifting-clutch G′ will be understood from an inspection of Figs. 6, 7, and 8. The plunger B, which supports the seat, is hollow and extends down within the base a suitable distance, according to the range of movement it is designed to give to the chair. Its exterior is turned truly cylindrical, and it is provided with a longitudinal slot or groove s', into which is fitted a key or pin t'', Fig. 11, attached to the clamp J', which causes the chair and cylinder L' to swing together in the horizontal plane. The lifting-clutch G' is raised by depressing the outer end of the lifting-lever I and carries the plunger B and the chair-body upward a certain distance at each movement of the lever. The clutch G' is drawn downward by the spring q', Fig. 6, its movements being indicated by the dotted lines in that figure. The lifting-lever I is pivoted at x' between projecting lugs on the cylindrical shell L', its inner end projecting inward and being pivoted to a connection y', which is pivoted to the wedge z', which causes the clutch G' to grasp the plunger during its upward movement. The clutch G' consists of a ring v', fitted to slide freely on the plunger B and provided with a recess on one side, within which are located the friction-piece o'', the wedge z', and the friction-rollers r'' s''. The ring v' is widened on one side to permit space for the recess containing these parts, as represented at f''. One of the sets of friction-rollers r'' is placed between the wedge z' and the side of the recess, and the other set s'' is placed between the inner face of the wedge and the outer surface of the friction-piece o''. The inner surface of the friction-piece is cylindrical and is fitted to the plunger B. When the wedge is forced upward by the depression of the outer end of the lifting-lever, it acts through the friction-rollers and forces the friction-piece against the plunger and at the same time draws the opposite side of the ring v' against the plunger, so that the latter is firmly gripped by the clutch, and the continued upward movement of the inner end of the lever causes the plunger to rise a certain distance. The inner end of the lever is then drawn downward by the spring q', attached at its lower end to the flange-plate X' and at its upper end to the link connection y', which movement releases the friction of the clutch on the plunger, so that the clutch can descend ready for another lifting operation. At its upper end the friction-piece is provided with lugs j'', Fig. 7, projecting over the recess to hold it in place. At its lower end the friction-piece has a projecting ledge k'', Figs. 6 and 20, extending toward the wedge, which prevents the friction-rollers from falling out. At its upper end the wedge is provided with projecting flanges extending outward, as indicated in Figs. 6, 7, and 20, to prevent the friction-rollers from slipping out of place and to transmit the force of the spring q' to the clutch. At the lower outer edge of the recess is secured the plate i'', Figs. 6 and 20, which holds the friction-rollers r'' up. The plunger serves as a guide for the clutch during its movements.

The holding-clutch I' is similar in construction and operation to the lifting-clutch, being provided with a wedge and friction-rollers and a friction-piece which bears against the plunger; but the wedge is attached to the standard by a suitable connection m''. Provision is also made for disconnecting the clutch from the plunger by raising it up slightly by means of the lowering-lever J, Figs. 1 and 9. The holding-clutch is placed in the upper part of the standard. It consists of a ring a'', Figs. 6, 9, and 13, having an enlargement on one side in which is a recess which receives the wedge b'', the friction-piece d'', and the friction-rollers e'' g''. The wedge is supported by a connection or link m''', which is pivoted to the upper end of the wedge and is attached to a pin inserted in the standard, so as to swing freely thereon. The thickest part of the wedge is below, so that when the plunger tends to descend the weight hangs on the wedge and the friction caused by the wedge acting through the friction-rollers forces the friction-piece against the plunger, thus preventing it from moving downward. The holding-clutch is, however, drawn downward constantly by the spring p'', Fig. 6. The spring p'' is attached to the segmental ring V', which is connected to the holding-clutch by the rods u'' u''', Figs. 7, 8, and 9, so that the spring draws the holding-clutch downward and produces friction on the plunger, except when it is raised by the depression of the lever J. Being attached to the upper part of the standard L', the clutch turns with the plunger whenever the chair is swung on the vertical axis. Suitable plates or projections are used to prevent the friction-rollers from slipping out of the recess in the ring a'', one of these plates being represented at k''', Fig. 13. The rollers are simple cylindrical rods, entirely free to adjust themselves in the space between the wedge and the side of the recess on one side and the friction-piece d'' on the other.

Figures 9, 10:
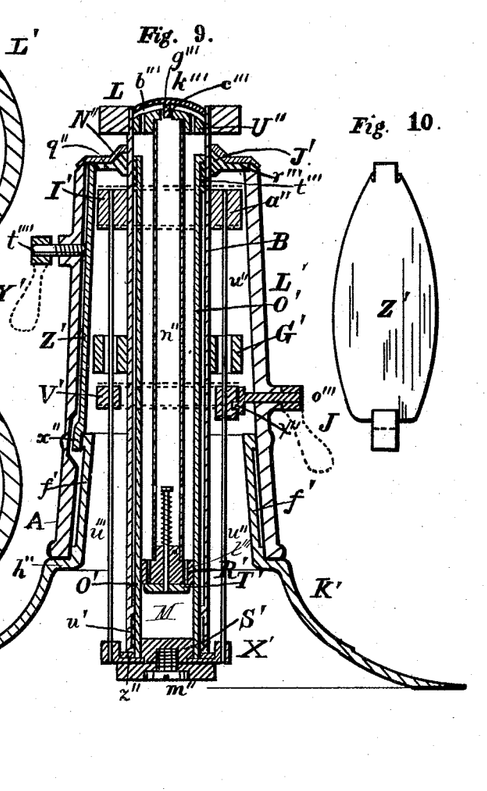
Fig. 9 is a central vertical section of the base, taken at right angles with Fig. 6 on the line 9 9, Fig. 6.
Fig. 10 is a side elevation of the clamp-lever.

In order to raise the holding-clutch so as to permit the plunger and chair to descend by releasing the grip of the friction-piece, I provide the inner end of the stem o''' of the lowering-lever J, Fig. 9, with a crank or eccentric x'', Figs. 9 and 15, which raises the segmental collar V' as the stem turns, and this movement is transmitted to the holding-clutch by the rods u'' u'''. The shape of the segmental collar is shown in Figs. 14 and 15, it being cut away on one side to permit the movement of the inner end of the lifting-lever and provided with a boss v''', in which is formed a slot w'', Fig. 15, which receives the crank x'' on the inner end of the stem o'''. It will thus be seen that depressing the outer end of the lever J raises the lifting-clutch by turning the stem o''' and causing the crank x'' on the inner end of the stem to lift the ring V' while sliding in the slot w'', so as to allow the plunger to descend, its movement being controlled by the fluid-column mechanism M'. The rods u'' u''' are secured in the collar V' by the set-screws y'', Figs. 14 and 15, which facilitate the adjustment of the collar at the proper distance from the clutch.

The rods $u''$ $u'''$ are firmly inserted in the ring $a''$ of the clutch. At their lower ends the rods enter and slide freely in holes in the flange-plate X', Figs. 6, 9, and 16, which is caused to turn about the vertical axis of the standard by the rods whenever the chair is swung horizontally. The springs $q'$ and $p''$ are attached at their lower ends to the flange-plate X', so that their tension is not varied by the swinging of the chair. The flange-plate is provided with a central opening, the edges of which pass under the lower end of the tube constituting the fluid-column, by which means the plate is held down against the pull of the springs. On the upper side of the plate is placed a washer $z''$, of rubber or other suitable material, against which the lower end of the plunger strikes at the end of its descending movement, so as to avoid a blow or jar at this time.

A clamp J' is provided by which the plunger can be firmly secured at any desired point and the swinging movement of the chair in the horizontal direction prevented. This clamp is located at the top of the standard, and it is arranged to be operated by the lever Y', Fig. 9, and the lever Z'. The lever Y' is provided with a screw-stem $t''''$, threaded through a suitable opening in the standard L', which screw, when the outer end of the lever is depressed, forces the lever Z' inward, its upper end closing up the clamp J' on the plunger and its lower end bearing at $x''$, Fig. 9, on the upper edge of the sleeve $f'$ on the base or pedestal K' and producing friction at this point, so as to prevent the horizontal movement of the chair. The lever is represented in Fig. 10 in side elevation, it being curved horizontally, so as to fit in between the inner surface of the standard L' and the clutches. The lever is made wide, so as to secure the requisite strength.

The clamp consists of a divided ring, one portion of which is forced against the plunger by the lever, while the other portion is supported against the standard. A spring or springs $p'''$, Fig. 11, is used to separate the portions of the divided ring when the clamp-screw is released. The inner surface of the divided ring is covered with felt or other suitable material adapted to produce a smooth and even friction on the polished surface of the plunger.

The clamp is shown in plan view in Fig. 11, in which $i'''$ $h'''$ represent the different parts of the divided clamp-ring, and $m'''$ $n'''$ the lines of division between the two parts. On each side of the line of division $n'''$ the ring is shown for a short distance in horizontal section, in order to represent the springs $p'''$, by which the portions of the ring are separated when the clamp is not in use. These springs are simply stiff spirals inserted in suitable recesses in one portion of the divided ring and bearing against the end of the other portion. The ring itself is shown in section in Fig. 12. On one side of the clamp the segment $i'''$ is provided with the projecting lug $q''$, against which the upper end of the clamp-lever Z' bears, and on the other side the segment $h'''$ is provided with a suitable projecting lug $r'''$, which is seated within a suitable recess in the upper part of the standard.

The clamp is provided with the key or pin $t''$, which fits the longitudinal groove $s'$ in the plunger and compels the plunger and the upper part of the standard to travel together when the chair is swung horizontally. The inner surface of the clamp-ring is faced with felt or other suitable fabric, as indicated at $v^4$, Figs. 11 and 12. This material may be fastened to the ring in any suitable manner—as, for instance, by the thread or cord $z'''$, which is passed through the edges of the fabric and draws them down tight against the surface of the ring, the edges being notched, if necessary, to effect this purpose.

The clamp-ring is located in a suitable recess in the upper part of the standard, a suitably-shaped cap N'' being placed over it and secured to the top of the standard.

The mechanism constituting the fluid-column by which the chair is gradually lowered, consists of a tube O', located within the plunger B, and within which a piston R' slides up and down, being connected to the plunger by the rod or tube $n''$. The piston R' is fitted to the tube O', so that as the chair is lowered the oil or other suitable liquid in the tube passes slowly around the piston and between it and the inner surface of the tube, thus securing a steady descent without jerk or jar, and the piston is provided with a valve T', Figs. 6, 9 and 17, which opens when the piston moves upward, permitting the oil above the piston to pass below it. The tube which holds the liquid column is closed at its lower end, so that no liquid can escape from it, being secured in place on the cross-bar U', so that it does not turn on its axis; but the piston turns within it and the plunger outside of it when the chair is swung around about its vertical axis. The cross-bar U' is secured to lugs on the pedestal K' by the screws $p'$. The lower end of the tube O' is closed by the plug S', which is fastened to the cross-bar U' by the screw $m''$, one or more pins $v''$, Fig. 6, inserted in the plug and the cross-bar, being used to prevent the tube from turning on its axis. The tube O' is provided near its upper end with a circular recess, within which is placed a leather washer $t'''$, Fig. 9, which bears with frictional contact against the interior of the plunger B. At the lower end the plunger is provided with a recess, in which is fitted another leather washer $u'$, which slides on the tube. The washers, being saturated with a suitable oil, serve to maintain the lubrication of the frictional surfaces of the tube and plunger and assist in guiding the latter in its up and down movements.

The piston R' is provided with a number of circumferential grooves $d'''$, Fig. 17, which serve to delay the oil in its passages from below to above the piston as the plunger descends. The lower part $e^3$ of the piston is made of a diameter to fit the interior of the tube O', but not so as to prevent the ascent of oil, and the projecting ridges $f'''$ $f^4$ $f^5$ between the grooves $d'''$ are made successively smaller from below upward, so as to permit the passage of the oil around the piston in a steady and uniform manner.

In analogous constructions heretofore used an unpleasant sound was caused by the swift current of oil escaping upwardly through a contracted passage when the piston descended to lower the seat occasioned by the sharp impact of said current upon the body of oil above. This "swishing" noise is obviated by the present improvement, the gradual enlargement upward of the oil-passage about the piston providing for a quiet and gradual disappearance of said current. Thus the ridge $f'''$ is slightly smaller than the diameter of the lower part $e'''$ of the piston, the next higher ridge $f^4$ is slightly smaller than $f'''$, and the ridge $f^5$ is smaller in diameter than $f^4$. This arrangement is somewhat exaggerated in the drawings.

The piston R is provided with a series of holes $l'''$, which permit the oil to pass through the piston when the plunger rises, the valve T', which is normally held closed by the spring $x'''$ on the rod $y'''$, opening at this time to permit the movement of the oil, as represented by the dotted lines in Fig. 17. The tube $n''$ is perforated with a number of holes $a'''$, which permit the oil or air to pass freely into or out of it. The upper end of the tube $n''$ is secured to the plunger B in any suitable manner—as, for instance, by the head U'' threaded into the interior of the upper end of the plunger. The head is provided with openings $b'''$ $c'''$, which permit air to pass into or out of the tubes O' and $n''$, as indicated in Fig. 9. The opening $c'''$ into the tube $n''$ is partially closed by a boss $g'''$ at the center of a cap $k'''$, Figs. 9 and 18, which boss is provided with grooves $p'''$, communicating with channels $s'''$ on the lower surface of the cap, by which the air is caused to enter the tube in a noiseless manner when the plunger descends.

The lifting-lever is provided with a joint (represented in Fig. 6) by which it can be folded inward toward the standard, so as to get it out of the operator's way. The outer part of the lever swings on the pivot W', as represented by the dotted lines in Figs. 1 and 6, a spring-catch P'' being employed to lock the joint in the lever when desired. The catch is located in a recess in the inner part of the lever, being provided with a spring by which it is constantly forced outward, so that its outer end engages with a notch in the outer part of the lever. A pin $e^4$ is inserted in the catch and extends outward, forming a projecting stud $n^4$, Fig. 1, by pressure on which the catch is forced inward, compressing the spring and disengaging the outer end of the catch from the notch, so that the outer end of the lever can fall by its own weight out of the way of the operator's feet. The rubber bumper $z^4$ serves to deaden the shock of the falling lever.

The segmental collar V' is provided on its upper side with a series of rubber bumpers $w'''$, against which the downward movement of the lifting-clutch is arrested without jar or shock.

I am aware that dental chairs have been heretofore provided with a swinging back-standard, and means for adjusting the same at various angles with the seat.

I claim—

1. The combination of the longitudinally-slotted swinging back-standard E of a dental chair, having projecting arms P pivoted on each side to the rear portion of the arms Q Q, attached to the seat-frame, and having a slotted centrally-located downward extension C', the notched bar B', pivoted to the seat-frame at $w'$ out of line with the pivots of the arms P, the spring-catch V, adapted to engage with any of the notches of the bar B', and the sliding handle $y$, placed at the upper end of the standard and connected with the spring-catch by the flexible connection $z$, the said connection being located in the slot of the standard and the spring-catch in its transversely-slotted extension, substantially as described.

2. The combination of the swinging back-standard E of a dental chair, arranged to support the slide F, carrying the adjustable head-rest G, and having projecting arms P pivoted on each side to the rear portions of the arms Q Q, attached to the seat-frame, and having a slotted centrally-located downward extension C', the notched bar B', pivoted to the seat-frame at $w'$ out of line with the pivots of the arms P, the spring-catch V, located in the extension and adapted to engage with any of the notches of the bar B', the sliding handle $y$, placed at the upper end of the standard and connected with the spring-catch by the flexible connection $z$, and an adjustable back, substantially as described.

3. The combination, with the seat of a dental chair, of the swinging back-standard E, pivotally connected with the seat on each side by means of the arms P P' and Q Q' and provided with slotted extension C', the notched bar B', pivoted to the rear of the seat out of line with the pivots of the standard, and the catch V, adapted to vary the inclination of the back relatively to the seat by engagement in one of the notches, substantially as described.

4. The combination, with the seat of a dental chair, of the swinging back-standard E, pivotally connected with the seat on each side by means of the arms P P' and Q Q' and provided with slotted extension C', the notched bar B', pivoted to the rear of the seat out of line with the pivots of the standard, the catch V, adapted to vary the inclination of the back relatively to the seat by engagement in one of the notches, a suitable clamp, and the slide F, having back D' pivoted thereto at its upper end and provided with means for securing it at different inclinations with the standard, substantially as described.

5. The combination, with the back-standard of a dental chair, of the head-rest G, the bent arm U V, fitted to slide and rotate in a socket in the standard, the rod Y, the ball and socket and clamping device adapted to hold the head-rest in any desired position with respect to the ball-and-socket joint and arranged to be adjusted lengthwise on the upper portion of the bent arm, a clamping-screw adapted to hold said rod and clamping device at any desired point on the bent arm, and mechanism constructed and arranged to simultaneously clamp the several parts which support the head-rest in any desired position, whereby the head-rest can be adjusted about its ball-supports, the latter moved directly to and from the chair-back, and the bent arm independently moved lengthwise of the back and rotated about the line of said movement, and whereby all of the parts can be clamped under any of said adjustments by a single clamp, substantially as described.

6. The combination, with the swinging back-standard E of a dental chair, provided with the slide F, having adjustable back D' secured thereto, of the head-rest G, the bent arm U V, fitted to slide and rotate in a socket in the standard, the rod Y, the ball-and-socket joint and the clamping device arranged to be adjusted lengthwise of the upper portion of the bent arm, and mechanism constructed and arranged to simultaneously clamp the head-rest against movement about its ball-supports and against movement lengthwise of the bar, and also to clamp the arm against both a sliding and a rotary movement in the standard, substantially as described.

7. The combination, with the back-standard of a dental chair, of the head-rest support consisting of the arm U, arranged to turn axially in the socket in the slide, a suitable clamp for securing it in any desired position, the toothed arm V, extending outward from the toothed arm U at an angle therewith, bars Z and A', provided with recesses having inclines engaging those of the arms V and U, a device for transmitting power from bar Z to bar A', clamp-screw T, head-rest G, supported by rod Y, having ball $o$, the socket-holding piece, and the socket or friction-piece $r$, said clamp-screw being located between the ball and socket and the standard-clamp and bearing upon a movable bar Z, adapted to transmit power both to the ball in its socket and the bar A', substantially as described.

8. The combination, with the back-standard of a dental chair and its slide F, of the head-rest G, the toothed bent arm U V, one part of which is fitted to a socket in the slide and the other adapted to support the head-rest, the longitudinally-movable bars Z A', provided with recesses having inclines engaging those of the toothed bent arm, the pivoted corner-piece $s$, and clamp-screw T, adapted to move the inclines of the bars upon those of the arms and also to clamp the ball, substantially as described.

9. The combination, with the back-standard E, of the rod U, provided with a longitudinal slot having inclined teeth $o'$ projecting from its bottom, the longitudinally-movable bar A', located within the slot and provided with inclined recesses fitting teeth $o'$, the bent arm V, provided with a longitudinal slot having inclined teeth, the longitudinally-movable bar Z, located in the slot, the pivoted corner-piece $s$, and a clamp provided with a clamp-screw T, said movable bars bearing on the corner-piece, one on each side thereof, and the whole adapted for simultaneous operation by the single clamp-screw, substantially as described.

10. The combination, with the seat-frame of a dental chair provided with extensions E' E', having grooves $c'$ $c''$, of the foot-rest H, having pins engaging said grooves, arranged to be adjusted vertically on the extensions, the curved lifting-lever F', pivoted directly to the foot-rest at $e'$ between its sides and resting loosely on the cross-bar $d'$, connecting the lower ends of the extensions and the toothed lever $j'$, pivoted to the lifting-lever and adapted to hold the foot-rest in the desired position by the engagement of one of its teeth with the bar $d'$, substantially as described.

11. The combination, with the seat of a dental chair provided with extensions E' E', having grooves $c'$ $c''$, the upper part of each of which has a rearward inclination greater than that of its lower part, of the foot-rest provided with pins to engage one the upper and the other the lower part of said grooves, and a lever loosely resting on its fulcrum and bearing against the bottom of the foot-rest and adapted to elevate the same and move the pins in the grooves, whereby the upper pins are moved farther to the rear than the lower and the foot-rest tilted, substantially as described.

12. The combination, with the smooth plunger B, of the lifting-clutch G', consisting of the recessed ring V', having a smooth interior surface fitting the plunger, the wedge $z'$, located in the recess and movable therein parallel to the plunger, the movable friction-piece $o''$ between the wedge and the plunger, and the friction-rollers $r''$ $s''$, interposed between the wedge and the recess on one side and the wedge and the friction-piece on the other, substantially as described.

13. The combination, with the smooth plunger B, of the lifting-clutch G', consisting of the recessed ring $v'$, having a smooth interior surface fitting the plunger, the wedge $z'$, located in the recess and movable therein parallel to the plunger, the movable friction-piece $o''$ between the wedge and the plunger, and the friction-rollers $r''$ $s''$, interposed between the wedge and the recess on one side and the wedge and the friction-piece on the other, the pivoted lifting-lever I, and the pivoted link $y'$, connecting the inner end of the lever with the wedge, substantially as described.

14. The combination, with the smooth plunger B, of the friction lifting-clutch G', consisting of the recessed ring provided with a movable wedge and friction-piece operated by the lifting-lever to cause the clutch to grip the plunger, and the friction holding-clutch I', provided with a movable wedge connected with the standard and arranged to operate a friction-piece which bears against the plunger, substantially as described.

15. The combination, with the smooth plunger B, of the holding-clutch I', consisting of the recessed ring, a wedge located within the recess and secured to the standard by a pivoted link or connection, and a movable friction-piece interposed in the recess between the wedge and the standard, substantially as described.

16. The combination, with the smooth plunger B, of the holding-clutch I', consisting of the recessed ring, a wedge located within the recess and secured to the standard by a pivoted link or connection, a movable friction-piece interposed in the recess between the wedge and the standard, and a lowering-lever, and connecting mechanism for elevating the ring of the clutch to release the friction and permit the descent of the plunger, substantially as described.

17. The combination, with the smooth plunger B, of the holding-clutch I', consisting of the recessed ring, a wedge located within the recess and secured to the standard by a pivoted link or connection, a movable friction-piece interposed in the recess between the wedge and the standard, the collar V', and rods $u''$ $u'''$, connecting the collar and the clutch, and the lowering-lever J, provided with crank $x''$, substantially as described.

18. The combination, with the raisable seat of a dental chair, of mechanism for controlling the descent of the seat, consisting of the tube O', filled with liquid, and the piston R', connected to the chair-seat and provided with a series of two or more circumferential grooves $d'''$, having the ridges between them of smaller diameter than the body of the piston below them, whereby the passage of the liquid upward between the piston and the interior of the tube is retarded, so as to secure the smooth descent of the chair-seat, and whereby the noise occasioned by such passage is obviated, substantially as described.

19. The combination, with the movable seat-supporting plunger B, of the stationary base K', rotatable standard L', supported on the base, the divided clamp-ring J' at the upper end of the standard, clamping-screw $t''''$, and clamp-lever $z'$, bearing both upon the clamp-ring and upon the base, whereby the plunger is secured in the standard and the standard is simultaneously prevented from turning on the base, substantially as described.

DEWELL STUCK.

Witnesses:
 GEO. B. SELDEN,
 C. G. CRANNELL.